United States Patent
Clark et al.

(10) Patent No.: US 7,585,138 B2
(45) Date of Patent: Sep. 8, 2009

(54) MACHINE GUARD

(75) Inventors: E-Charles Clark, Arlington, WA (US); Robert S. Schempp, Arlington, WA (US)

(73) Assignee: The Boeing Company, Chicago, IL (US)

( * ) Notice: Subject to any disclaimer, the term of this patent is extended or adjusted under 35 U.S.C. 154(b) by 298 days.

(21) Appl. No.: 11/527,061

(22) Filed: Sep. 26, 2006

(65) Prior Publication Data

US 2008/0072704 A1 Mar. 27, 2008

(51) Int. Cl.
*B23Q 11/08* (2006.01)
(52) U.S. Cl. .................. 408/56; 408/57; 408/241 G; 408/710; 409/134; 409/136; 74/609
(58) Field of Classification Search ............ 408/56, 408/57, 59, 97, 95, 241 G, 710; 409/134, 409/136; 74/608, 609, 612, 615, 616, 614; *B23Q 11/08*
See application file for complete search history.

(56) References Cited

U.S. PATENT DOCUMENTS

| | | | | |
|---|---|---|---|---|
| 2,335,614 A | * | 11/1943 | Spievak | 408/84 |
| 2,462,386 A | * | 2/1949 | Griffin | 408/234 |
| 2,657,595 A | * | 11/1953 | Shaff | 408/130 |
| 2,869,403 A | * | 1/1959 | Bent | 408/130 |
| 2,977,827 A | * | 4/1961 | Wenz | 408/59 |
| 3,470,789 A | * | 10/1969 | Morse | 409/235 |
| 4,290,717 A | * | 9/1981 | Aslen | 408/241 G |
| 4,388,028 A | * | 6/1983 | Bodin | 409/136 |
| 4,643,621 A | * | 2/1987 | Fuller et al. | 408/57 |
| 4,743,145 A | * | 5/1988 | Hendricks et al. | 408/59 |
| 4,749,316 A | * | 6/1988 | Hendricks | 408/239 R |

FOREIGN PATENT DOCUMENTS

DE 4139603 A1 * 6/1993
SU 956237 A * 9/1982

* cited by examiner

*Primary Examiner*—Daniel W Howell
(74) *Attorney, Agent, or Firm*—Tung & Associates

(57) ABSTRACT

A guard for a power-feed drill having a fluid inducer protects an operator from coming in contact with a rotating drive assembly. The drive assembly is enclosed by a cylindrical housing having a slotted opening through which a fluid inducer connection extends. The guard comprises a rotatable tube concentrically disposed within the housing and sleeved over the drive assembly so as to cover the opening presented by the slot. The fluid inducer connection passes through a helical groove in the tube.

23 Claims, 3 Drawing Sheets

MACHINE GUARD

BACKGROUND OF THE INVENTION

1. Field of the Invention

This invention generally relates to protective guards and safety shields for machine tools, and deals more particularly with a guard for a portable power-feed drill that shields the operator from the rotating spindle assembly and drill tool.

2. Description of the Related Art

A wide array of guards and safety shields have been devised to protect operators from moving parts of machine tools. In the case of motor driven, power-feed drills and reamers, the spinning drill/reamer, chuck and spindle pose a safety hazard for the operator. One type of portable power-feed drill widely used throughout industry employs a fluid inducer to feed cooling fluids or air down through the center of the drill tool to an opening in the end of the tool so that the fluid/air is fed directly to the cutting site. The fluid is fed to the rotating drill tool using a special fluid inducer, which comprises a fluid coupling connected with a source of the cooling fluid or air. The fluid coupling moves longitudinally with the spindle and drill chuck as the drill tool is fed toward the workpiece, but does not rotate with the spindle.

Power-feed drills of the type described above typically include a housing that surrounds the drill tool and to some degree, protectively shields the operator from coming in contact with a major portion of the rotating drive assembly. However, a longitudinal slot must be provided in the housing to allow a connector for the fluid inducer to move unobstructed through the housing during a feed stroke. This longitudinal slot is wide enough to expose the operator to a length of the rotating drive assembly and the drill tool, thus allowing for the possibility that hands, fingers, or clothing items could come in contact with the rotating drive and drill tool.

Accordingly, there is a need for a machine guard that can effectively protect the machine operator from coming in contact with that portion of the drill tool that is exposed within the slot formed in the housing. The present invention is directed towards satisfying this need.

BRIEF SUMMARY OF THE INVENTION

According to one aspect of the invention, a safety guard is provided for a power-feed drill having a rotating spindle assembly with a fluid inducer that is displaced during drill feed through a slot in a housing covering the spindle assembly. The guard comprises a cylindrical tube rotatably disposed within the housing and sleeved over the spindle assembly to guard an operator from contact with the spindle assembly through the slot. The tube includes a helical groove through which the fluid inducer extends. The tube is captured between the opposing internal shoulders of the housing. The groove has a width marginally greater than the width of the fluid inducer, and the length of the tube is greater than the length of the slots so that virtually the entire opening presented by the slot is covered by the tube. The groove has a pitch such that the groove traverses over the slot only once over the length of the slot.

According to another aspect of the invention, a guard is provided for a machine tool having a linearly displaceable tool drive covered by a protective shield and fitted with a fluid supply connector, the fluid supply connector being displaceable within and extending through a slot in the shield. The guard comprises a tube concentrically disposed within and between the shield and the tool drive. The tube has a sidewall covering the slot and the shield to prevent operator contact with the tool drive. The tube includes a curved groove therein through which the fluid connector extends. The groove is preferably helical and has a pitch such that the groove traverses over the slot only once over the length of the slot. The groove has a width marginally greater than the width of the fluid connector which bears against an edge of the tube defining the groove so that displacement of the fluid connector within the slot forces the tube to rotate.

In accordance with still another aspect of the invention, a guard for protecting a drill operator from contact with a rotating drive is provided for use with a portable drill having a power-feed, rotating drive for linearly displacing a rotary drill tool, a protective shield surrounding the drive and having a slot therein, and a fluid connector passing through the slot for coupling the drill tool with a supply of fluid. The guard comprises a guard body covering the slot and disposed between the shield and the rotating drive. The guard body has a curved groove therein through which the connector transversely extends. The connector is displaceable through a length of the groove as the rotary drive linearly displaces the tool. The guard body is preferably in the form of a tube and the curve comprises a helix. The helical groove has a pitch such that the groove transverses the slot only once over the length of the slot. The connector bears against an edge of the guard body defining the groove and causes the body to rotate as the fluid connector is displaced during a feed stroke.

The machine guard of the present invention is advantageous in that it is particularly simple in construction and easy to fabricate, but yet provides effective protection of an operator from contact with a rotating drive assembly. The machine guard can be easily retrofitted to existing machine tools such as power-feed, portable drills used extensively throughout industry.

These and other features, aspects and advantages of the invention will become better understood with reference to the following drawings, description and claims.

DETAILED DESCRIPTION OF THE INVENTION

Figure 1:
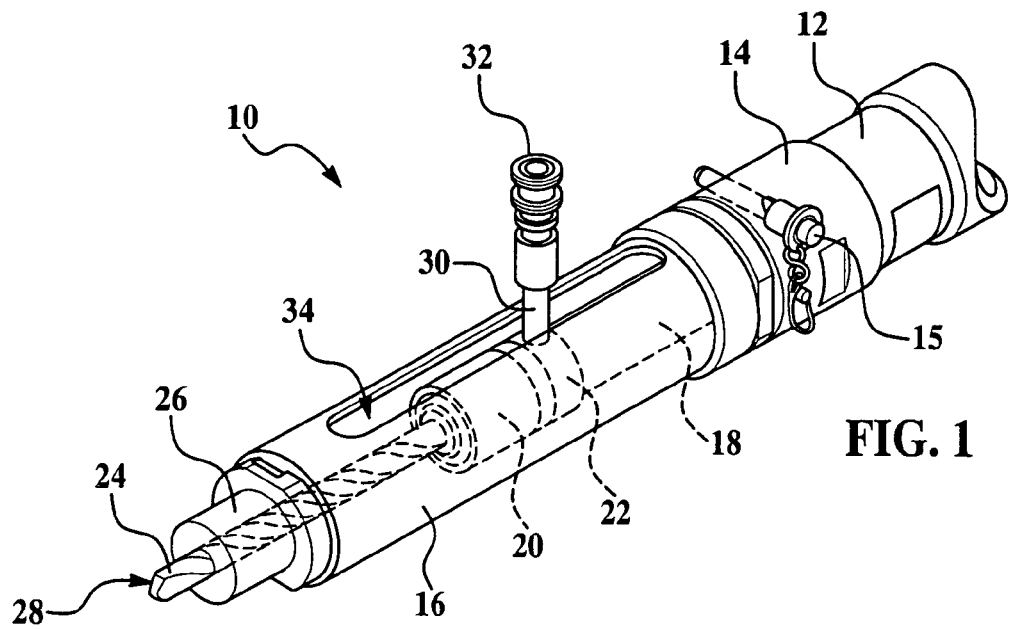
FIG. 1 is a perspective view showing the nose assembly portion of a power-feed drill on which the machine guard of the present invention may be used.
Figure 2:
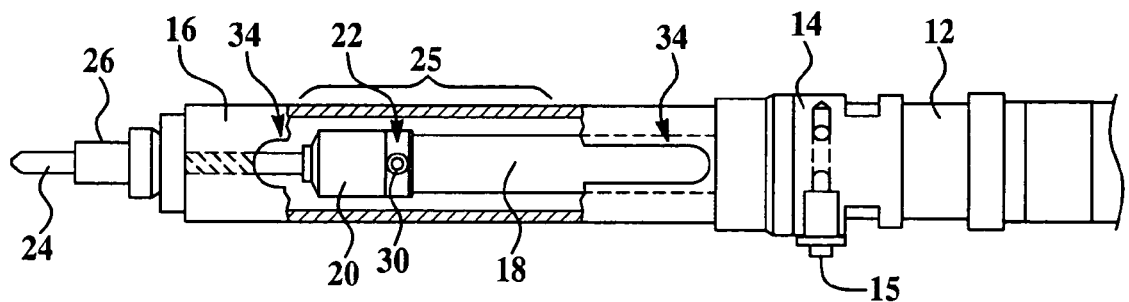
FIG. 2 is a top view of the nose assembly shown in FIG. 1, parts of the housing being broken away in section to better reveal the tool drive assembly.

Referring first to FIGS. 1 and 2, the present invention relates to a machine tool, which in the illustrated example, comprises a power-feed, portable drill having a nose assembly 10 which is connected to an electric motor (not shown) and power feed mechanism (not shown) that linearly displaces the nose assembly 10 during a feed stroke between a retracted position and a displaced position in which a drill tool 24 or similar tool such as a reamer (not shown) performs a machining operation on a workpiece (not shown). Although a power-feed drill has been selected to illustrate use of the machine guard of the present invention, it is to be understood that the inventive machine guard could be used with other types of machines and machine tools that include characteristics of the illustrated drill, including so-called offset powerfeed drills.

The nose assembly 10 includes the lower end of an electric motor housing 12 to which there is releaseably connected a quick change nosepiece 14 held on the motor housing 12 by a locking pin 15. The drive output of the motor is connected through an elongate spindle shaft 18 to a tool chuck 20 that releasably holds a tool, which in the illustrated example, comprises a drill tool 24.

The drill tool 24 is provided with a through-the-tool fluid inducer 22 which introduces cooling fluids or lubricants through an opening 28 at the end of the drill bit 24. The through-the-tool fluid supply system comprises an annularly shaped fluid inducer 22 surrounding the lower end of the spindle shaft 18. A fluid connector 30 extends axially outward from the fluid inducer 22 and terminates in a fitting 32 which connects the fluid inducer 22 to a source (not shown) of cooling or lubricating fluid. The fluid inducer 22 includes internal passageways (not shown) which deliver the fluid through the lower end of the spindle shaft 18, and a central passageway in the drill tool 24, to the fluid opening 28. Details of one example of a fluid inducer are shown in U.S. Pat. No. 4,743,145 issued May 10, 1988, and assigned to the assignee of the present invention, the contents of which are incorporated herein by reference.

The nose assembly 10 of the power-feed drill further includes a cylindrically shaped housing 16 which provides, to some degree, a protective shield around drive assembly 25. The drive assembly 25 comprises spindle shaft 18, chuck 20 and drill tool 24, all of which rotate and therefore present a hazard to the drill operator. The lower end of the housing 16 is closed by a bushing 26 through which the drill tool 24 may pass during a drill stroke. The fluid connector 30 passes outwardly through an elongate slot 34 in the housing 16. The slot 34 provides the clearance necessary to allow connector 30 to be linearly displaced relative to housing 16 during a drill stroke.

Although the housing 16 shields the operator from much of the rotating drive assembly 25, the slot 34 is nevertheless wide enough to expose the operator to a portion of this rotating hazard. For example, the slot 34 is wide enough to allow an operator's finger or clothing item to pass into contact with the drive assembly 25, thus posing a risk of injury. In accordance with the present invention, a guard 36 is provided which shields the operator from contact with the drive assembly 25 throughout the length of the slot 34.

Figure 3:
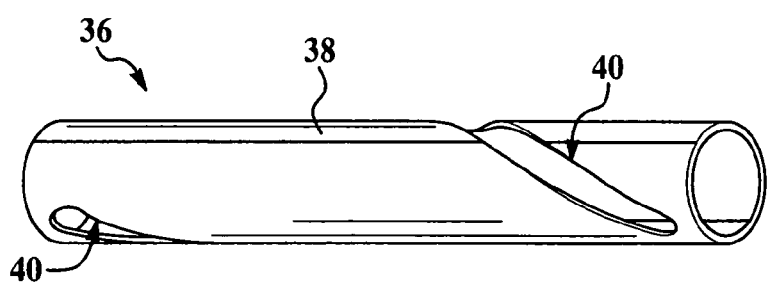
FIG. 3 is a perspective view of the machine guard of the present invention.
Figure 4:
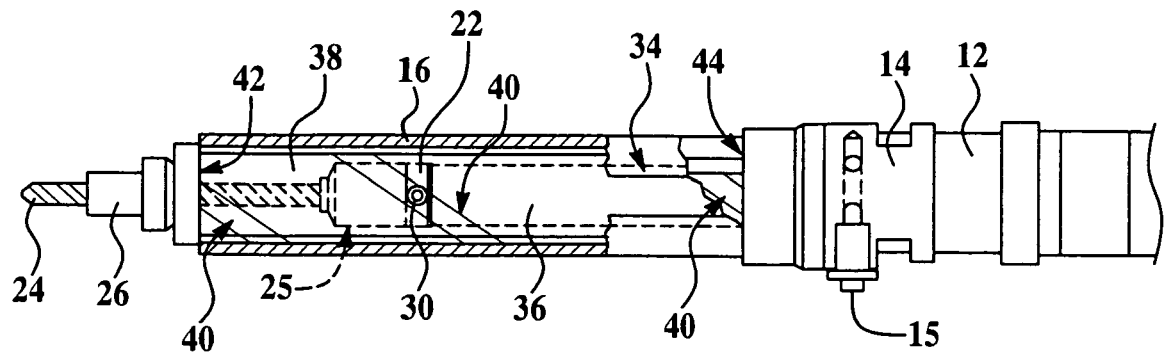
FIG. 4 is a view similar to FIG. 2 but showing the machine guard of FIG. 3 installed on the nose assembly, additional portions of the housing having been broken away in section to reveal mounting of the guard.
Figure 5:
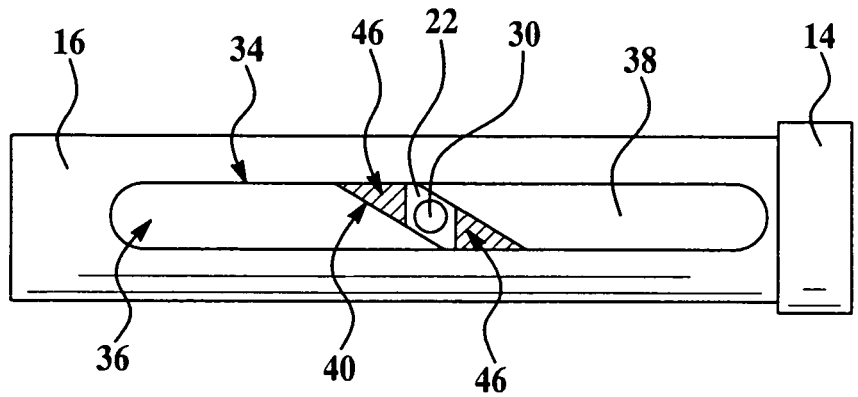
FIG. 5 is a top view of the housing showing the machine guard having been installed therein.

Referring now to FIGS. 3-5 the machine guard 36 of the present invention comprises a cylindrical tube body 38 formed of rigid material such as metal, plastic or other materials that are impervious to cooling and lubricating fluids. Where it is necessary or desirable to be able to view the drive assembly 25, the guard 36 may be formed from a transparent synthetic material such as PVC or LEXAN™ (polycarbonate). A curved groove 40 is formed through the sidewall of the body 38, preferably in the form of a helix. The ends of the groove 40 terminate adjacent to, but do not pass through the corresponding ends of the tube body 38. In the illustrated example, the pitch of the helical groove 40 is such that the groove makes a single revolution along its length. The groove terminates adjacent the respective ends of the cylindrical body 38. Body 38 is sleeved over the drive assembly 25 so as to be concentrically disposed between the housing 16 and the drive assembly 25. The opposite ends of the tube body 38 are captured between an internal shoulder 44 on the nosepiece 14 and an interior face of the bushing 42.

As best seen in FIGS. 4-5, the connector 30 extends radially outwardly through the groove 40 which traverses diagonally across the opening in housing 16 presented by the slot 34. The pitch of the groove 40 is preferably selected such that the groove 40 traverses across the slot 34 only once along the length of the entire slot 34. Thus, it can be seen that the sidewall of the tube body 38 overlies the drive assembly 25 over almost the entire length of the slot 34, thereby preventing the operator from making inadvertent contact with parts of the drive assembly 25 through the slot 34. The width of the groove 40 is selected so as to be marginally greater than the width of the connector 30, which in the illustrated example, is circular in cross section. As a result, only a small section shown by the cross hatching 46 presents an opening in the tube body 38 which might provide opportunity for contact with the drive assembly 25, however this open section is generally insufficient to present a safety hazard.

Figure 6:
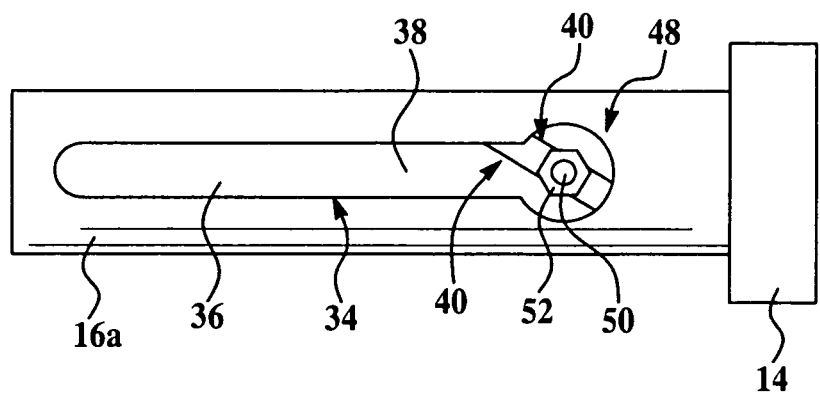
FIG. 6 is a top view of an alternate form of the housing.

FIG. 6 depicts an alternate embodiment of the invention in which the housing 16a is provided with an enlarged, circularly shaped opening 48 at one end of the slot 34. A fluid connector 50 for delivering fluid to the fluid inducer 22 has a threaded exterior for receiving a lock 52. The width of the groove 40 in the guard body 38 is less than the width of the nut 52, consequently the nut 52 overlies edges of the groove 40, causing the guard body 38 to be trapped between the nut 52 and the fluid inducer 22. The enlarged opening 48 provides sufficient clearance around the nut 52 to permit a tool to be fitted over the nut 52 during installation or removal of the machine guard 36.

It should be noted here that although machine guard 36 of the present invention has been described as protecting the operator from the entire drive assembly 25, including the drill tool 24, the rotating drive parts that present a hazard to the operator will vary, depending on the size, and type of dill or other machine tool. For example, the configuration of the machine tool may be such that the machine guard 36 only need protect the operator from the rotating spindle shaft 18.

In use, when the drive assembly 25 is displaced toward a workpiece during a feed stroke, the connector 30 is likewise displaced linearly within the slot 34. As connector 30 is displaced, a portion of its sidewall bears against one edge of the tube body 38 defining the groove 40. Displacement of the connector 30 imposes a force on the tube body 38 within the groove 40 which includes a circumferential component that causes the tube body 38 to rotate inside the housing 16. As the connector 30 continues its linear displacement, the tube body 38 continues to rotate so that the slot 34 remains covered by the tube body and the exposed portion 46 of the groove moves along and tracks with movement of the connector 30. When the drive assembly 25 reaches its fully displaced position in the feed stroke and reverses direction, the connector 30 likewise reverses its direction, causing it to bear on the opposite edge of the tube body 38 defining the groove 40. This oppositely directed force imposed on the tube body 38 by the connector 30 causes the tube body 38 to rotate in the opposite direction, as the drive assembly 25 returns to its retracted position.

Figure 7:
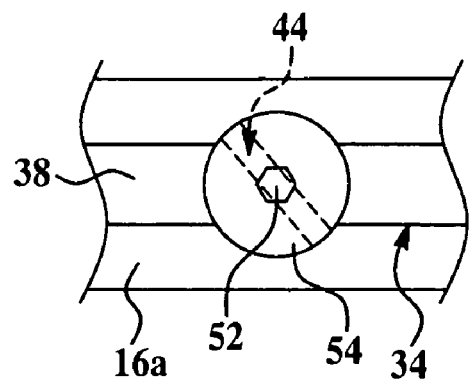
FIG. 7 is an enlarged, fragmentary view of a portion of the housing, showing a protective guard cover.
Figure 8:
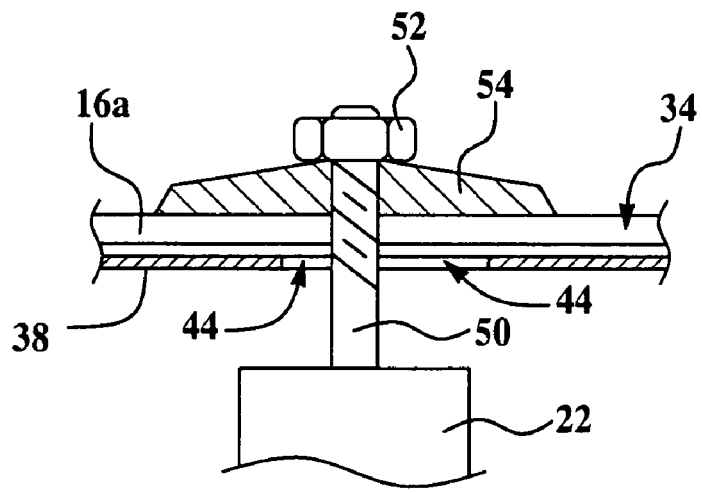
FIG. 8 is a sectional view through the housing portion shown in FIG. 7, depicting how the guard cover overlies the exposed portions of the groove in the guard.

As previously indicated, the small area 46 (FIG. 5) in the groove 40 which remains exposed to the drive assembly 25 is generally insufficient to pose a hazard to an operator. Nevertheless, in some applications, it may be desirable to cover this small exposed area, and in this connection, attention is now directed to FIGS. 7 and 8. A washer-like cover 54 is trapped between the nut 52 and the outer surface of the housing 16a, overlying the groove 40. Cover 54 has a central opening which receives the connector 50 therethrough so that the cover 54 is constrained to move together with the connector 50 along the length to the slot 34, sliding over the outer surface of the housing 16a. Cover 54 is depicted as being circular in the illustrated embodiment, however it take the form of other shapes as well, depending on the application. Importantly, however, the cover 54 must have sufficient width to cover the exposed open areas 46 in the groove 40. The cover may be formed of any suitable material such as metal, plastic or hard rubber.

Figure 9:
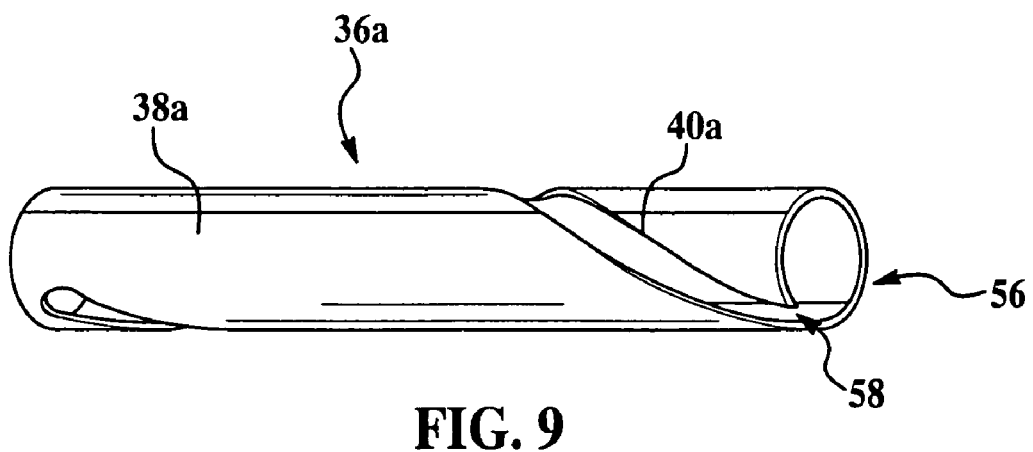
FIG. 9 is a perspective view of an alternate embodiment of the machine guard.

FIG. 9 shows an alternate embodiment of the Machine guard 30a which is identical to the embodiment shown in FIG. 3, except that one end Of the groove 40a extends the entire length of the tube body 38a, so as to define an opening 58 at the end of the tube body 38a. This opening 58 facilitates the installation and removal of the guard 36 on the nose assembly 10, since, depending upon the drill configuration, fewer parts of the nose assembly are required to be disassembled.

Although this invention has been described with respect to certain exemplary embodiments, it is to be understood that the specific embodiments are for purposes of illustration and not limitation, as other variations will occur to those of skill in the art.

What is claimed is:

1. A safety guard for a drill having a rotating spindle assembly and a fluid inducer connector displaced during drill feed through a slot in a housing covering the spindle assembly, comprising:
    a cylindrical tube rotatably disposed within the housing and sleeved over the spindle assembly to guard an operator from contact with the spindle assembly through the slot, the tube including a helical groove through which the fluid inducer connector extends, the cylindrical tube adapted to rotate as the fluid inducer connector is linearly displaced along the slot in the housing;
    wherein the length of the tube is greater than the length of the slot.

2. The safety guard of claim 1, wherein the tube is captured between opposing shoulders within the housing.

3. The safety guard of claim 1, wherein the helical groove has a pitch such that the groove makes approximately one revolution around the tube over the length of the tube.

4. The safety guard of claim 1, wherein the groove has a width marginally greater the width of the fluid inducer connector.

5. The safety guard of claim 1, wherein the groove has a pitch such that the groove traverses across the slot only once in response to the displacement of the fluid connector over the length of the slot.

6. The safety guard of claim 1, wherein the groove extends through one end of the tube to define a groove opening at the one tube end.

7. The safety guard of claim 1, further comprising a cover connected to the fluid inducer connector and overlying the housing, the cover protectively covering portions of the groove adjacent the fluid inducer connector.

8. A guard for a machine tool having a linearly displaceable tool drive covered by a protective shield and provided with a fluid supply connector, the fluid supply connector being displaceable within and extending through a slot in the shield, comprising:
    a tube concentrically disposed between the shield and the tool drive, the tube having a sidewall covering the slot in the shield to prevent operator contact with the tool drive, the tube including a curved groove therein through which the fluid connector extends;
    wherein the length of the tube is greater than the length of the slot.

9. The guard of claim 8, wherein the groove is helical.

10. The guard of claim 8, wherein the helical groove has a pitch such that the groove makes approximately one revolution around the tube over the length of the tube.

11. The guard of claim 8, wherein the groove has a width marginally greater the width of the fluid connector.

12. The guard of claim 8, wherein the groove has a pitch such that the groove traverses over the slot only once over the length of the slot.

13. The guard of claim 8, wherein the connector bears against an edge of the tube defining the groove, and displacement of the fluid connector within the slot rotates the tube.

14. The guard of claim 8, wherein the groove extends through one end of the tube to define a groove opening at the one tube end.

15. The guard of claim 8, further comprising a cover connected to the fluid supply connector and displaced therewith, the cover overlying the shield and protectively covering portions of the groove adjacent the fluid supply connector.

16. A guard for use with a portable drill having a powerfeed rotating drive for linearly displacing a rotary drill tool, a protective shield surrounding the drive and having a slot therein, and a fluid connector passing through the slot for coupling the drill tool with a supply of fluid, the guard for protecting a drill operator from contact with the rotating drive through the slot, the guard comprising:
    a guard body covering the slot and disposed between the shield and rotating drive, the guard body having a curved groove therein through which the connector transversely extends, the connector being displaceable through a length of the groove as the rotary drive linearly displaces the tool;
    wherein the length of the guard body is greater than the length of the slot.

17. The guard of claim 16, wherein the body is a tube.

18. The guard of claim 16, wherein the curve is a helix.

19. The guard of claim 16, wherein the groove has a pitch such that the groove makes approximately one revolution around the tube over the length of the guard body.

20. The guard of claim 16, wherein the groove has a width marginally greater the width of the fluid connector.

21. The guard of claim 18, wherein the helical groove has a pitch such that the groove traverses over the slot only once in response to the displacement of the fluid connector over the length of the slot.

22. The guard of claim 16, wherein the fluid connector bears against an edge of the guard body defining the groove, and displacement of the fluid connector within the slot rotates the guard body.

23. A safety guard for a drill having a rotating spindle assembly and a fluid inducer connector displaced during drill feed through a slot in a housing covering the spindle assembly, comprising:
    a cylindrical tube rotatably disposed within the housing and sleeved over the spindle assembly to guard an operator from contact with the spindle assembly through the slot, the tube including a helical groove through which the fluid inducer connector extends;
    wherein the tube is captured between opposing shoulders within the housing.

* * * * *